(12) United States Patent
Lee

(10) Patent No.: US 6,556,187 B1
(45) Date of Patent: Apr. 29, 2003

(54) METHOD FOR TRANSMITTING DATA OF WIRELESS KEYBOARD HAVING TRACK-BALL

(75) Inventor: Ji Sung Lee, Suwon-si (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 174 days.

(21) Appl. No.: 09/626,829

(22) Filed: Jul. 27, 2000

(30) Foreign Application Priority Data

Jul. 28, 1999 (KR) .......................................... 99-30849

(51) Int. Cl.⁷ ................................................ G09G 5/00
(52) U.S. Cl. ........................ 345/168; 345/169; 710/73; 341/53; 375/242
(58) Field of Search .......................... 45/167, 168, 169, 45/158, 164; 710/65, 67, 73, 62; 359/146, 142, 143; 348/734; 375/242; 341/53

(56) References Cited

U.S. PATENT DOCUMENTS

| 4,599,723 | A | * | 7/1986 | Eck .............................. 714/798 |
| 5,307,297 | A | | 4/1994 | Iguchi et al. |
| 5,515,051 | A | * | 5/1996 | Tanaka et al. ................ 341/174 |
| 5,640,160 | A | * | 6/1997 | Miwa ............................ 341/51 |
| 5,737,107 | A | * | 4/1998 | Umeda ......................... 359/146 |
| 5,903,259 | A | * | 5/1999 | Brusky et al. ............... 345/168 |
| 5,917,631 | A | * | 6/1999 | Shafer ......................... 359/142 |
| 5,990,868 | A | * | 11/1999 | Frederick ..................... 345/158 |
| 6,031,470 | A | * | 2/2000 | Asari et al. .................... 341/22 |
| 6,052,116 | A | * | 4/2000 | Takagi .......................... 345/169 |
| 6,064,697 | A | * | 5/2000 | Yoshikawa ................... 375/242 |
| 6,147,719 | A | * | 11/2000 | Shafer ......................... 348/734 |
| 6,211,862 | B1 | * | 4/2001 | Park et al. .................... 345/169 |

* cited by examiner

Primary Examiner—Steven Saras
Assistant Examiner—Fritz Alphonse
(74) Attorney, Agent, or Firm—Renner, Otto, Boisselle & Sklar, LLP

(57) ABSTRACT

A method for transmitting data of a wireless keyboard device having a track-ball, which transmits track-ball data and keyboard data more effectively, and thereby simplifies the process and reduces the current consumption of the keyboard device. The data transmission method transmits a leader signal composed of five chips including three consecutive low signals followed by a high signal and a low signal, thereafter transmits data that contains track-ball data and keyboard scan data recorded in the same data format, and, instead of check-sum code, allocates the complementary value of the code value of the third byte (Byte3) into the fourth byte (Byte4) and transmits it so that the transmission error can be checked by simply comparing the third byte and the fourth byte.

6 Claims, 7 Drawing Sheets

|       | Bit 7 | Bit 6 | Bit 5 | Bit 4 | Bit 3 | Bit 2 | Bit 1 | Bit 0 |
|-------|-------|-------|-------|-------|-------|-------|-------|-------|
| Byte 1 | 0 | 0 | 0 | SPARE | | Application | L-Windows | R-Windows |
| Byte 2 | Make=0/Break=1 | FN | L-Shift | R-Shift | L-Art | R-Art | L-Ctrl | R-Ctrl |
| Byte 3 | KEY POSITION CODE | | | | | | | |
| Byte 4 | USER ID | | | | CHECKSUM | | | |

(PRIOR ART)

FIG. 3a

|       | Bit 7 | Bit 6 | Bit 5 | Bit 4 | Bit 3 | Bit 2 | Bit 1 | Bit 0 |
|-------|-------|-------|-------|-------|-------|-------|-------|-------|
| Byte 1 | 1 | 1 | 1 | 1 | 1 | M-BUTTON | R-BUTTON | L-BUTTON |
| Byte 2 | X-AXIS POSITION | | | | | | | |
| Byte 3 | Y-AXIS POSITION | | | | | | | |
| Byte 4 | USER ID | | | | CHECKSUM | | | |

(PRIOR ART)

FIG. 3b

|  | Bit 7 | Bit 6 | Bit 5 | Bit 4 | Bit 3 | Bit 2 | Bit 1 | Bit 0 |
|---|---|---|---|---|---|---|---|---|
| Byte 1 | 0 | 0 | MAKE=00/ BREAK=11 | | USER ID | | | |
| Byte 2 | KEY POSITION CODE | | | | | | | |
| Byte 3 | FN | L-Shift | R-Shift | L-ALT | R-ALT | L-CTRL | R-CTRL | Application |
| Byte 4 | L-Win | R-Win | SPARE | | CHECKSUM | | | |

FIG. 5a

|  | Bit 7 | Bit 6 | Bit 5 | Bit 4 | Bit 3 | Bit 2 | Bit 1 | Bit 0 |
|---|---|---|---|---|---|---|---|---|
| Byte 1 | 1 | 1 | SPARE | | USER ID | | | |
| Byte 2 | X-AXIS POSITION | | | | | | | |
| Byte 3 | Y-AXIS POSITION | | | | | | | |
| Byte 4 | M-BUTTON | L-BUTTON | R-BUTTON | SPARE | CHECKSUM | | | |

FIG. 5b

|  | Bit 7 | Bit 6 | Bit 5 | Bit 4 | Bit 3 | Bit 2 | Bit 1 | Bit 0 |
|---|---|---|---|---|---|---|---|---|
| Byte 1 | 0 | 0 | 0 | SPARE | | Application | L-Windows | R-Windows |
| Byte 2 | Make=0/Break=1 | FN | L-Shift | R-Shift | L-Art | R-Art | L-Ctrl | R-Ctrl |
| Byte 3 | KEY POSITION CODE | | | | | | | |
| Byte 4 | KEY POSITION CODE | | | | | | | |

FIG. 6a

|  | Bit 7 | Bit 6 | Bit 5 | Bit 4 | Bit 3 | Bit 2 | Bit 1 | Bit 0 |
|---|---|---|---|---|---|---|---|---|
| Byte 1 | 1 | 1 | 1 | 1 | 1 | M-버튼 | R-버튼 | L-버튼 |
| Byte 2 | X-AXIS POSITION | | | | | | | |
| Byte 3 | Y-AXIS POSITION | | | | | | | |
| Byte 4 | Y-AXIS POSITION | | | | | | | |

FIG. 6b

METHOD FOR TRANSMITTING DATA OF WIRELESS KEYBOARD HAVING TRACK-BALL

BACKGROUND OF THE INVENTION

1. Field of the Invention

The present invention relates to a method for transmitting data from wireless keyboard, that is an input device of personal computer, having track-ball, and more particularly relates to a method for transmitting data of wireless keyboard having track-ball that is able to transmit keyboard data and track-ball data more effectively at the same time.

2. Description of the Prior Art

A keyboard device and a mouse device are typical input devices of personal computer. And recently, with highly developed technologies, in order to solve the problems that occur because of keyboard device and/or mouse device being wired to computer main body and the cost problems and the installation problems that occur because of a mouse and a keyboard are independently installed from main body, a wireless keyboard device having track-ball, that combines a mouse into a keyboard(73) in a track-ball(732) type as described in FIG. 7 and performs a data transmission with personal computer(72) by wireless signals such as infrared or high-frequency signals, is being developed.

The wireless keyboard device mentioned above, as described in FIG. 7, has advantages such as the installation and operation become simple because wiring cable is not needed for data transmission to computer(72), and numbers of users are able to use a computer simultaneously by connecting numerous keyboards to a computer. However, compared with a wired keyboard device, it has a handicap that key-scan data and/or track-ball data could be easily miss-transmitted by surrounding noises and/or the other causes.

FIG. 1 is a block diagram illustrating a general data transmission method of wireless keyboard. It carries out a scanning by a certain period and transmits the scanned data in a packet unit. The transmission period(T1) of said packet is, for example, 25 msec, and a packet comprises a leader signal(in other words, it is called preamble signal) that notifies data transmission to computer main body to be synchronized, and the 4 bytes of data, transmitted consecutively after said leader signal, that contain keyboard and/or track-ball data.

In general, the data of wireless keyboard is transmitted by well-known 4 PPM(Pulse Position Modulation) method.

In the prior art, as described in FIG. 2, a code of 0001110 is transmitted as a leader signal using 7 chips. Here, because the size of a single chip is 321.4 μm, the leader signal has the size of 2.249 ms( 321.4 μm×7=2.249 ms).

In general, the main function of a leader signal is to make receiving part(of personal computer) to acknowledge that the following data is to be received and to make an input device and the main body to be synchronized easily. In case that a leader signal becomes larger as described above, it has an advantage, in the receiving part, that it has very strong noise-resistance, however, in the transmitting part that has to transmit data consecutively with designated period, it has problems that data handling becomes difficult and current consumption becomes large because of the large size of the signal.

In addition, for the case of wireless keyboard having track-ball, track-ball data and keyboard data should be transmitted together. In this case, if the data structures of keyboard data and track-ball data are different from each other, receiving part should be constructed to be able to handle the two different formats, and thereby the program size of the receiving part becomes large and it becomes inefficient.

SUMMARY OF THE INVENTION

The present invention relates to a method for transmitting data of wireless keyboard having track-ball, which transmits track-ball data and keyboard data more effectively, and thereby simplifies the processes of receiving part and reduces the current consumption of keyboard device. The data transmission method of wireless keyboard having track-ball in accordance with the present invention transmits a leader signal composed of five chips comprising the first three consecutive low signals and the following high signal and low signal, thereafter transmits data that contains track-ball data and keyboard scan data recorded in the same data format, and, instead of check-sum code, allocates the complementary value of the code value of the third byte (Byte3) into the fourth byte(Byte4) and transmits it so that the transmission error can be checked by simply comparing the third byte and the fourth byte, and thereby reduces the current consumption of keyboard device and simplifies the receiving processes of computer.

BRIEF DESCRIPTION OF THE DRAWINGS

The above objects and other advantages of the present invention will become more apparent by describing in detail the preferred embodiment of the present invention with reference to the attached drawings on which:

FIG. 3 are views illustrating structures of wireless keyboard data and track-ball data of the prior art.

FIG. 5 are format diagrams illustrating embodiments of the structures of keyboard data and track-ball data in accordance with the data transmission method of the present invention.

FIG. 6 are format diagrams illustrating other embodiments of the structures of keyboard data and track-ball data in accordance with the data transmission method of the present invention.

DETAILED DESCRIPTION OF THE PREFERRED EMBODIMENT

The present invention is proposed to solve the problems mentioned above. It is therefore the object of the present invention to provide a method for transmitting data of wireless keyboard having track-ball, which transmits track-ball data and keyboard data more effectively, and thereby simplifies the processes of receiving part and reduces the current consumption of keyboard device.

To achieve said object, the data transmission method of wireless keyboard having track-ball in accordance with the present invention comprises the steps of transmitting a leader signal composed of five chips comprising the first three consecutive low signal and the following high signal and low signal, and transmitting data that contains track-ball data and keyboard scan data followed by said leader signal.

Referring to appended drawings, the data transmission method of wireless keyboard having track-ball in accordance with the present invention is now described.

Figure 1:
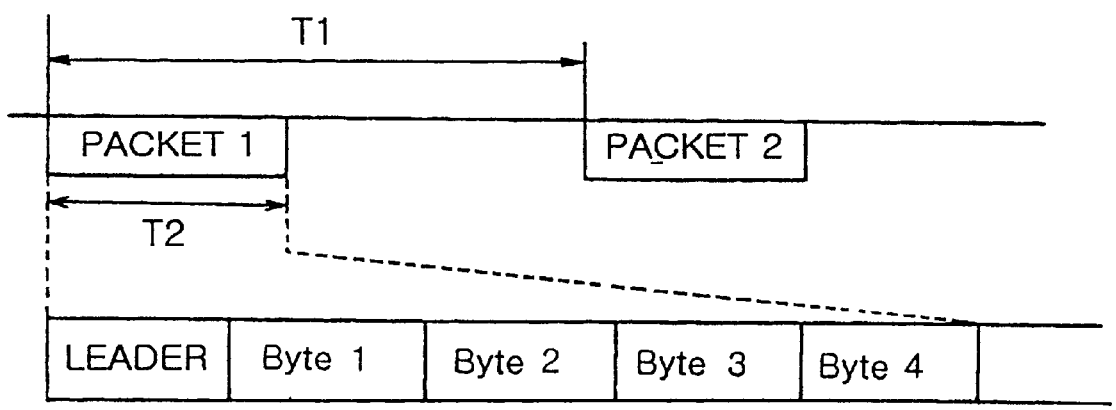
FIG. 1 is a block diagram illustrating a general data transmission method of wireless keyboard.
Figure 2:
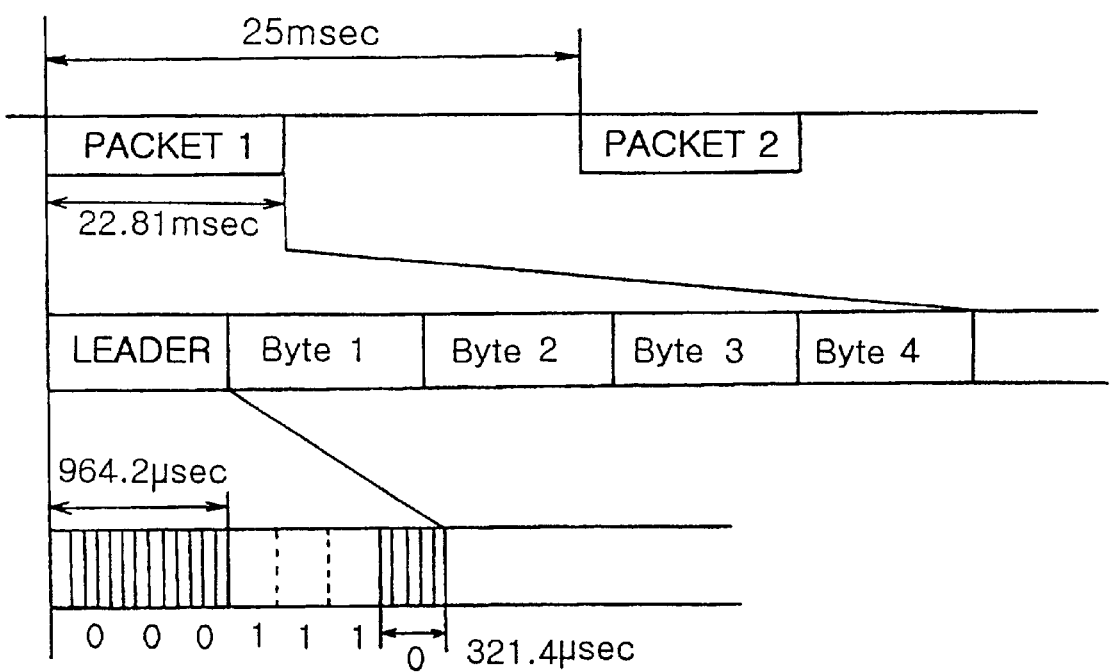
FIG. 2 is a block diagram illustrating a leader signal structure of wireless keyboard of the prior art.
Figure 4:
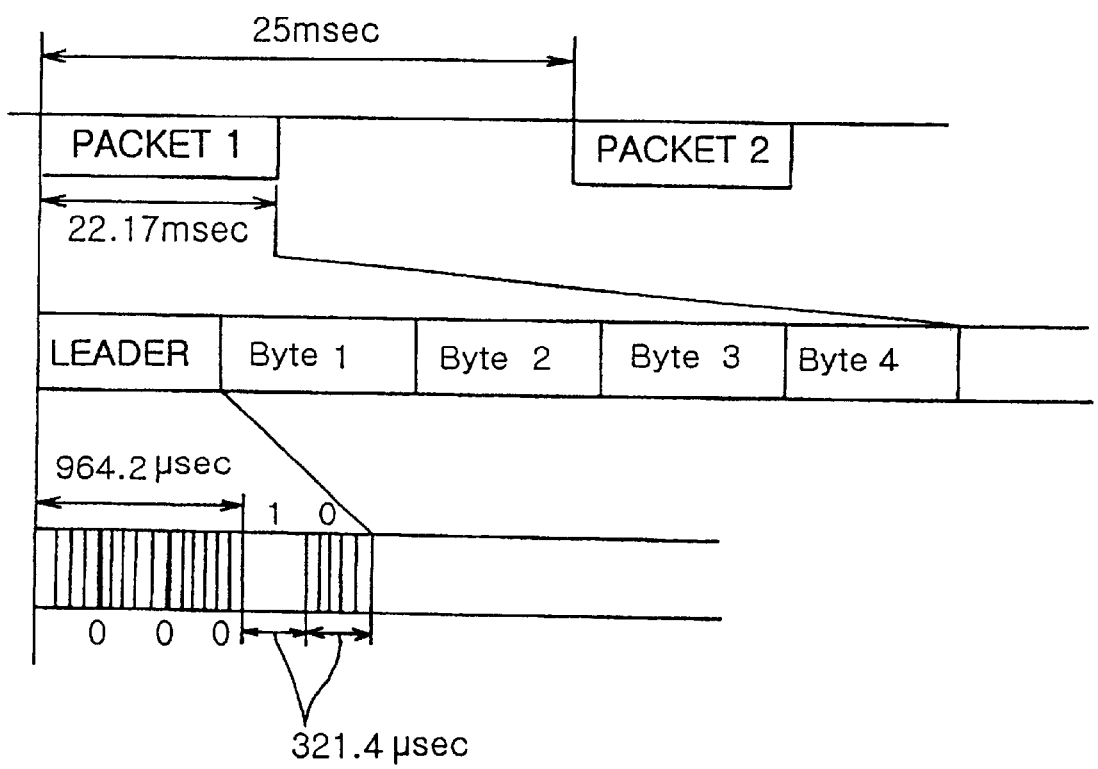
FIG. 4 is a block diagram illustrating a leader signal structure of wireless keyboard in accordance with the present invention.
Figure 7:
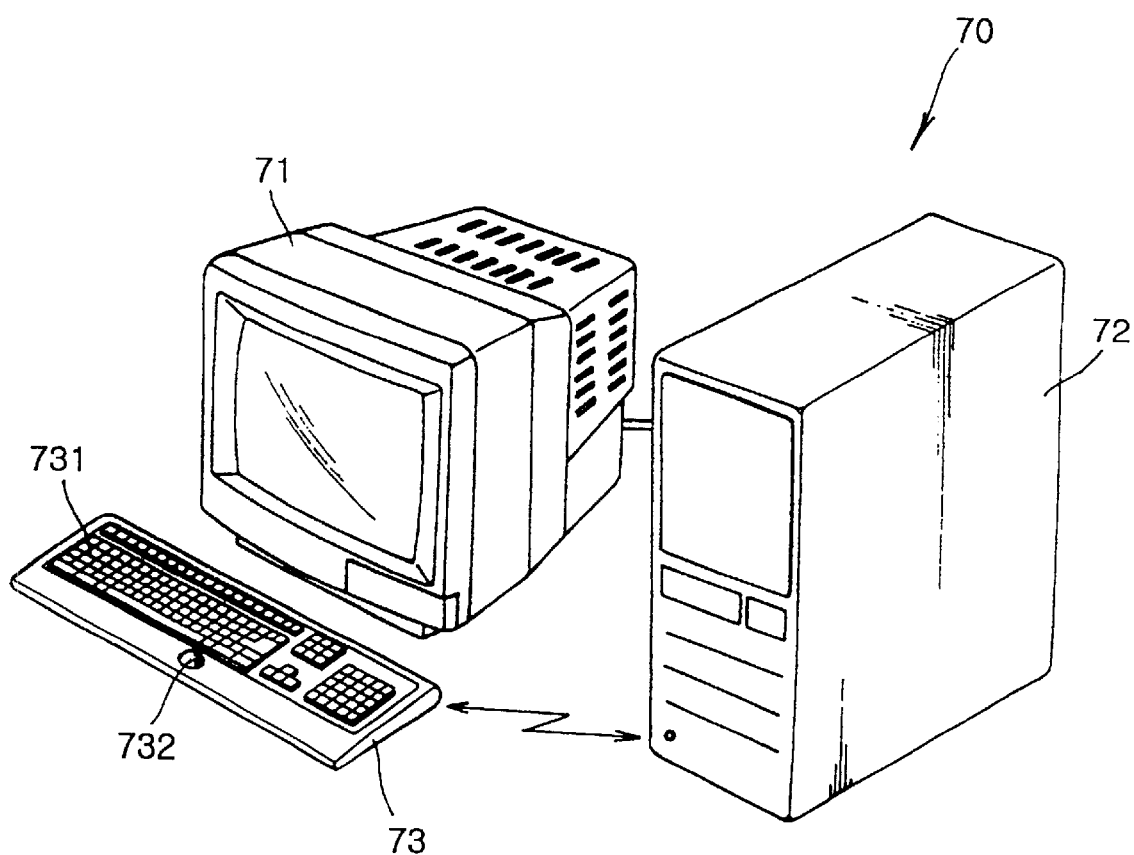
FIG. 7 is a perspective view illustrating a general structure of computer system with wireless keyboard having track-ball.

FIG. 4 is a block diagram illustrating the structure of a packet transmitted from wireless keyboard in accordance with data transmission method of the present invention. The packet comprises a leader signal and 4 bytes of track-ball and/or keyboard data, wherein the leader signal is composed of 5 chips of '00010'.

As described before, data transmitted from wireless keyboard is modulated by 4 PPM method, in which low signal('0') can not be transmitted three times in a row.

In the present invention, using this characteristic, it transmits three consecutive low signals to be acknowledged as a leader signal, and transmits a high signal('1') to make receiving part to be synchronized and transmits a low signal to notify the end of leader signal, and thereby reduces the size of leader signal.

A leader signal constructed under the above mentioned method, in case that the size of a single chip is 321.4 $\mu$m as usual, has the size of 1.607 ms(5×321.4 $\mu$m) because it is composed of 5 chips.

The size of leader signal is therefore reduced by 579 $\mu$m compared with that of prior art, and it means the size of each packet is reduced by that amount. So, in the wireless keyboard that transmits track-ball data and keyboard data in said packet unit consecutively with designated period(25 msec), it means a considerable amount of total current consumption can be saved.

In the data transmission method of wireless keyboard having track-ball in accordance with the present invention, the 4 bytes of data, that are consecutively transmitted after the leader signal, are constructed as described in FIG. 5. In the first byte(Byte1), a data, that identifies whether it is a keyboard data or a track-ball data, is allocated and, in addition, a device ID and an user ID are also allocated to make receiving part acknowledge that the data is transmitted from which user. And according to the data type(keyboard data or track-ball data), keyboard scan data and/or track-ball position scan data are allocated into the second byte(Byte2) and the third byte(Byte3). And then, a check-sum is allocated into the fourth byte(Byte4) to check whether there is a transmission error or not.

In case of keyboard data, as described in FIG. 5a, in the first byte(Byte1) that is transmitted first, the upper two bits(BIT7, BIT6) are allocated to transmit a keyboard code value('00') that indicates keyboard data, and the next two bits(BIT5, BIT4) are allocated to indicate whether the transmitted code is a code that is transmitted when a key is pressed(MAKE) or a code that is transmitted when a pressed key is released(BREAK). For example, the MAKE value is set to be '00' and the BREAK value to be '11'. And in the rest four bits(BIT3~BIT0), user ID is allocated and transmitted to identify each user in case of multi-user system.

In the second byte(Byte2) that is transmitted second, the whole 8 bits(BIT7~BIT0) are used to transmit key position codes of the keys pressed or the keys released after being pressed.

Next, in the third byte(Byte3) that is transmitted third, each bit is allocated for the data which indicates that the special key, that could be lost easily by obstacles while being transmitted by infrared(IR), is pressed or released. That is, each bit is respectively allocated for the left and right Shift keys, Alt keys, Ctrl keys, and so on, thereby indicates, by its state value, whether the corresponding special key is pressed or not.

In the fourth byte(Byte4) that is transmitted last, four bits(BIT3~BIT0) are allocated for a check-sum to check transmission error, and the rest four bits are used to transmit the data that indicates the states of the rest special keys(L-WIN, R-WIN) that are not allocated in the third byte(Byte3).

In case of transmitting track-ball data, as described in FIG. 5b, in the first byte(Byte1), like in the case of keyboard data described in FIG. 5a, two bits(BIT7, BIT6) are allocated to transmit a device code that indicates the data is track-ball data(for example, '11'), and four bits (BIT3~BIT0) are allocated to transmit user ID.

In the second byte(Byte2) and the third byte(Byte3), the values of track-ball position variations in X-axis and Y-axis are transmitted respectively. And finally in the fourth byte (Byte4), four bits(BIT3~BIT0) are allocated for a check-sum to check transmission error, and the rest four bits (BIT7~BIT4) are allocated to transmit the data that indicates the pressing states of the center, the left, and the right mouse buttons(M-Button, L-Button, R-Button).

In case that track-ball data and keyboard data are transmitted in the above mentioned data format, the computer, in the receiving process, after receiving a leader signal and the following four bytes of data, is able to identify the user and identify whether the data is a track-ball data or a keyboard data by checking the first byte. And according to this identification, it reads the codes recorded in the rest bytes to confirm the keyboard data and/or the track-ball data and decides whether the transmission error happens or not by checking the check-sum code in the fourth byte. Therefore, the program for receiving process can be constructed in a simple way.

And, in the above, it is said that some bits are allocated for transmitting user ID for the case of multi-user system, however, with considering that only one keyboard is generally used for a personal computer so that the user ID is not necessary in usual cases, instead of user ID, the complementary value of the value allocated in the third byte can be allocated into the fourth byte to simply check the transmission error without an extra check-sum calculation. By this substitution, the transmitting part simply allocates the complementary value of the third byte into the fourth byte instead of performing an extra check-sum calculation, and the receiving part also simply compares the values of the third byte and of the fourth byte without an extra check-sum calculation to check the transmission error.

FIG. 6, which illustrate other embodiments of the present invention, show data structures according to the data transmission method of wireless keyboard having track-ball. FIG. 6a illustrates a structural diagram of data for the keyboard data transmission and FIG. 6b for the track-ball data transmission.

Referring to appended drawings, for the case of keyboard data transmission, as described in FIG. 6a, the signal comprises the first byte(Byte1) that is allocated for scan data of window keys and a data indicating a keyboard data, the second byte(Byte2) that is allocated for the data indicating the pressing states of function keys, the third byte(Byte3) that is allocated for the corresponding key-scan values of the general keys pressed, and the fourth byte(Byte4) that is allocated for the complementary values of the key position codes allocated in the third byte(Byte3).

Therefore, the transmitting part of keyboard data, at the time of each data packet transmission, transmits leader signal followed by transmitting the first byte that contains a setting code to indicate keyboard data and data indicates the pressing states of window keys, and transmits the second byte in which the flag values, that indicate the pressing states of various function keys, and transmits the third byte that contains code values corresponding to the general keys pressed, and finally transmits the fourth byte that contains the complementary values of the values recorded in the third byte. The receiving part receives leader signal and the following four bytes, and check whether the values in the third byte and the values in the fourth byte are complementary. If they are complementary, it concludes that there is no transmission error and processes the received data. Otherwise, it concludes that there is a transmission error and carries out an appropriate procedures such as a request for a re-transmission of the data and so on.

In case of track-ball data that has the type of pointer input, the data comprises, as described in FIG. 6b, the first byte (Byte1) that is allocated for a data indicating track-ball data and for the scan data of track-ball button input, the second and the third byte(Byte2, Byte3) that are allocated for the X position value and the Y position value of the pointer respectively, and the fourth byte(Byte4) that is allocated for the complementary value of the Y position value allocated in the third byte(Byte3).

In this case, by simply checking the code values of the third byte and the fourth byte comparatively, the receiving part is able to check the transmission error. Therefore, the program for an extra checksum calculation is not necessary.

EFFECT OF THE INVENTION

As mentioned before, in the data transmission of wireless keyboard having track-ball, the present invention reduces the current consumption of wireless keyboard device by reducing the data size, thereby achieves an energy saving, and reduces the size of required program capacity of receiving computer by simplifying the receive-handling program by means of transmitting track-ball data and keyboard data in the same format. In addition, it checks the transmission error without an extra check-sum calculation to eliminate check-sum calculation process from the transmit-handling program and the receive-handling program, thereby simplifies those programs.

What is claimed is:

1. A method for transmitting data of wireless keyboard having a track-ball, comprising the steps of:

transmitting a leader signal composed of five chips including three consecutive low signals followed by a high signal and a low signal;

transmitting a first byte that is allocated a device code that indicates whether the data is keyboard data or track-ball data and a user ID that identifies the present user consecutively after transmitting the leader signal;

transmitting second and third bytes that are allocated the values of X,Y position variations of the track-ball in the case of track-ball data transmission, or allocated the values of special key data and key position codes in case of keyboard data transmission; and transmitting a fourth byte that is allocated a check-sum code to check transmission error.

2. The method for transmitting data as claimed in claim 1, wherein in the case of track-ball data transmission, the first byte comprises 2 bits of device code that indicates track-ball data, 2 bits of spare code, and 4 bits of user ID, the second byte and the third byte comprise the values of track-ball position variations in X-axis and Y-axis respectively, and the fourth byte comprises 3 bits of button data, 1 bit of spare code, and 4 bits of check-sum.

3. The method for transmitting data as claimed in claim 1, wherein in the case of keyboard data transmission, the first byte comprises 2 bits of device code that indicates keyboard data, 2 bits of MAKE/BREAK code that indicates whether the transmission starts during the key is pressed or during the key is released, and 4 bits of user ID, the second byte comprises 8 bits of respectively allocated special key data, the third byte comprises the values of key position codes, and the fourth byte comprises 2 bits of window key data, 2 bits of spare code, and 4 bits of check-sum.

4. A method for transmitting data of wireless keyboard having track-ball comprising the steps of:

transmitting a leader signal composed of five chips including three consecutive low signals followed by a high signal and a low signal;

transmitting a first byte that is allocated a device code that indicates whether the data is keyboard data or track-ball data consecutively after transmission of said leader signal;

transmitting second and third bytes that are allocated the values of X,Y position variations of the track-ball in case of track-ball data transmission, or allocated the values of special key data and key position codes in case of keyboard data transmission; and, transmitting a fourth byte that is allocated the complementary value of a scanned key code or a track-ball position code, instead of an extra calculated check-sum code.

5. The method for transmitting data as claimed in claim 4, wherein in the case of keyboard data transmission, the first byte is allocated for a code that indicates keyboard data and a code that indicates the pressing states of window keys, the second byte is allocated for flag values that indicate the pressing states of various function keys, the third byte is allocated for scan code values of the general keys pressed, and the fourth byte is allocated for the complementary values of the values of the third byte.

6. The method for transmitting data as claimed in claim 4, wherein in the case of track-ball data transmission, the first byte is allocated for a code that indicates track-ball data and a code that indicates the pressing states of buttons, the second byte is allocated for the value of track-ball position in X-axis, the third byte is allocated for the value of track-ball position in Y-axis, and the fourth byte is allocated for the complementary values of the third byte.

* * * * *